United States Patent [19]

Grenet et al.

[11] Patent Number: 5,240,728
[45] Date of Patent: Aug. 31, 1993

[54] PROCESS FOR THE PREPARATION OF PARBOILED WHEAT GRAINS FOR HUMAN CONSUMPTION

[75] Inventors: Corinne Grenet, Chateaudun; Joël Abecassis, Le Cres; Pierre Feillet, Montpellier Cedex, all of France

[73] Assignee: Establissements Viron (S.A.), France

[21] Appl. No.: 874,698

[22] Filed: Apr. 28, 1992

[30] Foreign Application Priority Data

Mar. 16, 1992 [EP] European Pat. Off. ........ 92440035.1

[51] Int. Cl.$^5$ ........................... A23B 9/04; A23P 1/14
[52] U.S. Cl. .................................... 426/461; 426/629; 426/508; 426/460; 426/243
[58] Field of Search ............... 426/629, 507, 508, 455, 426/456, 459, 460, 461, 462, 243

[56] References Cited

U.S. PATENT DOCUMENTS

| | | | |
|---|---|---|---|
| 3,162,535 | 12/1964 | Ferrel . | |
| 3,745,019 | 7/1973 | Huxsoll | 426/508 |
| 3,851,085 | 11/1974 | Rodgers | 426/507 |
| 3,962,479 | 6/1976 | Coldren | 426/507 |
| 3,979,375 | 9/1976 | Rao | 426/507 |
| 4,055,673 | 10/1977 | Mueller | 426/507 |
| 4,126,707 | 11/1978 | Hart | 426/462 |
| 4,442,130 | 4/1984 | Autrey | 426/462 |
| 4,632,833 | 12/1986 | Gannon | 426/459 |
| 4,649,055 | 3/1987 | Kohlwey | 426/459 |
| 4,737,371 | 4/1988 | Bookwalter | 426/508 |
| 4,761,291 | 8/1988 | Sugisawa | 426/459 |
| 4,761,297 | 8/1988 | Sugisawa | 426/459 |
| 4,769,251 | 9/1988 | Wenger | 426/459 |
| 4,871,567 | 10/1989 | Sterner | 426/507 |
| 5,017,395 | 5/1991 | McCaskill | 426/459 |
| 5,061,497 | 10/1991 | Thacker | 426/459 |
| 5,089,281 | 2/1992 | Baz | 426/461 |
| 5,130,153 | 7/1992 | McIlroy | 426/462 |

*Primary Examiner*—Carolyn Paden

[57] ABSTRACT

Process for the preparation of a foodstuff for human use comprising:
selecting hard wheat grains according to their size,
preheating the selected grains,
moistening the preheated grains,
keeping the moistened grains at rest for a period of time,
cooking the grains,
drying and cooling the cooked grains,
hulling the grains,
expanding the hulled grains,
reconditioning the expanded grains to their initial water content, and
recovering the reconditioned grains in view of their domestic use as foodstuff.

20 Claims, No Drawings

PROCESS FOR THE PREPARATION OF PARBOILED WHEAT GRAINS FOR HUMAN CONSUMPTION

BACKGROUND OF THE INVENTION

Field of the Invention

This invention relates to a new foodstuff for human use and to a continuous process for making the same.

This new foodstuff is from the class of starchy foods such as rice, potatoes and derivatives thereof, and has a number of advantages making it an exceptionally superior product.

SUMMARY OF THE INVENTION

The basic product obtained by the process of the invention comprises wheat grains parboiled and hulled in a fully new manner.

There are many products prepared from wheat grains, either non-cooked or puffed, or in the form of all kinds of noodles and the same. However, parboiled and hulled wheat grains have not been commercialized for the reason that although apparently simple, a satisfactory process for making the same is in fact comparatively intricate, due to the structure and the features of wheat grains.

Basically, the process of the invention comprises the following steps, each being carried out in very specific conditions:
cleaning and grading of the grains,
dampening (watering) in view of a subsequent gelatinization of the contained starch; this treatment is preferably carried out after a prior heating,
rest in warm conditions; this treatment accelerates the water migration to the grain heart or core,
cooking in specific conditions to prepare the grains for subsequent treatments and to improve their culinary qualities,
drying and cooling,
mechanical hulling,
expansion treatment to make the grains porous and non-sticky,
re-dampening (moistening) back to a normal water content.

DESCRIPTION OF THE PREFERRED EMBODIMENTS

The specific conditions of the above steps are the following:

The hard wheat grains, which are for example, from Beauce (France), are cleaned by a cleanser and a suction device, then graded in grading drums with a view to select the preferred grain size, e.g. 2.0 to 2.8 mm for small grains and 2.8 to 3.5 mm for bigger grains. The broken grains are disposed of in alveolate drums.

There are obtained therefrom homogeneous grains in all respects, i.e. which shall give homogeneous products in all subsequent steps; when used as commercial foodstuffs, such products will be homogeneously cooked, without a chance of sticking, and with a regular cooked texture.

Such homogeneous grains are then pre-heated, to a temperature of 30° to 100° C. This pre-heating must be carried out in a fast and uniform manner, e.g. under Infra Red radiation or preferably in a microwave apparatus. In the latter case, the grains are conveyed by a steel helix rotated in a PYREX tube (microwave transparent). The microwaves are absorbed in the water contained in the grains. The treatment takes about 2 minutes. The feed rate depends on the power of the microwaves apparatus and on the selected preheating temperature, as follows:

| POWER (Watts) | Pre-heating temperature °C. | Obtained feed rate (Kg/h) |
|---|---|---|
| 1200 | 90 | 120 |
| 1200 | 50 | 280 |
| 1200 | 30 | 600 |
| 2000 | 90 | 200 |
| 2000 | 50 | 450 |
| 2000 | 30 | 1000 |

The pre-heated grains are then dampened with hot water, at a dosage of 38–62 and preferably 54 liters of water for each 100 kg of grains to reach a final moisture of 38–45%. The water is carefully applied to be fully absorbed and to avoid dripping.

During this step, a screw conveyor provided with mixing rods is rotated at such a speed that the treatment is carried out in 20–120, and preferably 30–45 minutes of stay.

The temperature of the grains and of the water is adjusted to ensure mixing at a constant temperature comprised between 50° and 90° C. during all the stay. If needed a heat insulator or an additional heater can be used.

The warmer the blend, the faster the water penetrates into the grains.

The reason for this preliminary treatment is that, in order to have the starch gelatinized during the cooking operation, the grains should have an optimal water content, which is comprised between 20% for cooking at 140° C. and 40% for cooking at 90° C.

This step is followed by a rest period, for which the grains are kept at the same high temperature (between 50° and 90° C.) during 1 to 2 hours, which results in increase migration speed of water to the grain core.

The next step is the grain cooking proper. To this effect, the grains are conveyed through a microwave oven for a cooking period approximatively equal to the pre-heating period. The temperature of the grains reaches 50°–90° C. at the oven inlet and 90°–105° C. at the oven outlet.

This treatment has for purposes:
regarding the subsequent treatments:
  to improve the hulling conditions of the grain, by increasing the breakage resistance and maintaining the grain shape,
  to facilitate the grain expansion,
  to improve the penetration of the vitamins and of the mineral salts during the final steeping step,
and regarding the culinary qualities of the final product:
  better appearance,
  lack of sticking, and
  better taste resulting from the moderate cooking temperature.

According to a preferred modification of this process, the overall steps of pre-heating, dampering, resting and cooking of the grains, the purpose of which is essentially to gelatinize the starch is carried out continuously in a single reactor comprising a cylindrical housing in which a coaxial screw is rotated to convey the grains along said housing from an inlet to an outlet, subsequent reactions of this reactor having created and maintained therein the sequential specific conditions of the sequential above steps by injection of steam by perforated pipes, the temperature of said steam in each section of the reactor being thermostatically controlled, as well as the rate flow of said steam, depending on the speed of the screw.

The process is controlled so that:

the final water content of the grain at the reactor outlet is between 30 and 50% (preferably 40–45% for hard wheat), which is needed for the starch gelatinization;

the cooking temperature is 90°-100° C., which should be reached as soon as possible in the reactor and kept at this level all along the reactor;

the residence time in the reactor is comprised between 30 and 90 minutes (preferably 45 and 60 minutes for hard wheat), according to the grain size. This time is controlled by adjusting the rotating speed of the screw.

This time can be appreciated as:

a first period of about 20 minutes to absorb all the added water. During this period, the peripheric starch of the grains starts its gelatinization.

A second period of about 40 minutes to have said water migrating to the grain core. The gelatinization progresses accordingly to reach also the grain core when the water content of said core has reached the requested level.

From this respect, it should be emphasized that the "continuous" process has an outstanding advantage, in relation with the grain structure:

In fact, in each of the above steps, the periphery of the grain is first affected by the involved treatment (temperature, water content, gelatinization), the action of each treatment progressively affecting the inner area of the grain, to reach the core only after a given period.

Therefore, in this preferred modification, the successive steps of the process are carried out in the reactor in such a manner that each step is starting during the preceding step; in other words, each step is not starting at the end of the preceding step but during the last moments of said preceding step, i.e. the peripheric effects of a step are starting when the grain core is reached by the effects of the preceding step.

In addition to the resulting saving of time, the advantages of such a continuous process are:

only one process operation in a single reactor, no excess of water, which prevents any loss of vitamins and of mineral salts in the cooking water and the waste of used waters, limited absorption of water, which prevents a possible bursting of the grains (when the water content exceeds 55%) and drying costs, protection of the grains against mechanical effects such as crushing, shocks, frictions.

The last step, i.e. cooking, is followed by a drying step carried out in a rotating drum containing three coaxial cylinders through which an air draft sweeps the grains. The inlet temperature of the air draft is 120°-150° C. and the outlet temperature is 60°-80° C., the contact time being comprised between 30 and 75 minutes. Said air is constantly re-cycled to keep its relative humidity above 20%. The water content of the grain is of 10-20%, preferably 14-17% so that the grain surface does not "crease", which makes the hulling step easier.

After the step cooking/drying, the product is cooled to room temperature in order to prevent a hulling step carried out upon too "elastic" grains, which could warm up and break the grains. The grains are therefore air-ventilated with the triple purpose to cool them, harden them and to stabilize their water content.

The next step of the process is a fundamental one: the dried grains are hulled for the purpose disclosed thereafter.

To this effect, the grains are abraded in a vertical hulling apparatus comprising seven millstones stacked on a vertical shaft and spaced by perforated struts, said assembly being rotated in a perforated housing provided with bran discharging means.

The abrasion time and extent are controlled by adjusting the outlet door. The average residence time is of 1-2 minutes per pass and 2-4 passes are needed to reach a hulling rate of 15-25% by which all the grain surface except the groove is hulled. The grains are subsequently selected to suppress the small broken grains which would give brown chips during the following expansion step.

The purpose of the above hulling step is to reduce the domestic cooking time of the final product. As an example, the cooking time of hulled grains is 30 minutes instead of 60 minutes for a grain still having its envelopes. In addition, this treatment prevents grain distortions or appearance defects ("speckled" look) and promotes higher appetency properties (taste, smell, texture).

The last fundamental step of this process is a grain expansion treatment.

To this effect, the grains are laid as a thin layer upon a perforated belt by means of a vibrating table and are passed between two infra-red panels during 14-30 seconds to reach a temperature of 170°-210° C.

This treatment results in an expansion of the grains by 1.3-2.0 times their initial size, which makes them porous.

Such a porosity is essential to further reduce the domestic cooking time, which is now lowered to 10-20 minutes only, depending on the grain size, without affecting the grains gustative qualities. It has also for effect to still reduce the sticking of the grains.

Preferably, subsequently to this last step, the grains are re-moistened by spraying a water drizzle upon the warm grains laid in thin layer to have their water content restored to its initial value of 12-13%.

Instead of water, the sprayed liquid can be a solution or a more or less complex mixture, which can also contain a suspension of fine particles.

By such additional step, it is possible to realize a flavouring with no mixing or drying treatment: the liquid is instantly absorbed by the still warm porous grains which recover the water lost during the expansion, whereas the contained aromatic substances are strongly adsorbed upon the porous surface, which prevents a flaking away from the grain to settle on the container, which occurs with the coating processes. It is therefore possible to determine the quantity of any kind of additives which complement the dietetic value of the product itself, e.g. spices, mineral salts, vitamins, essential amino-acids, flavouring agents, coloring agents and the same.

This invention has therefore for its primary object the process for treating wheat (or hard wheat) grains as has been described above.

It has also for its object the new products obtained by said process, under all its modifications.

Said products are essentially parboiled and hulled full grains of wheat (hard wheat), having the following basic properties:

Size (gauging): from small (2-2.8 mm) to large (2.8-3.5 mm)
Weight of 1000 grains: from 21 g (small) to 31 g (large)
Water content: 12-13%
Water absorption speed at the boiling point (to double the dry weight, which corresponds to a final water content of 67%): from 14 minutes (small grains) to 20 minutes (large grains).
Expansion rate: 1.35-1.40
Oligo-elements content, in mg/100 g:
   calcium: from 39.2 (small grains) to 39.5 (large grains)
   magnesium: from 26.8 (small grains) to 37.8 (large grains)
   iron: from 1.74 (small grains) to 3.08 (large grains)
Colour
   luminescence: from >69 (small grains) to >70 (large grains)
   Red Index: 1.5 (small grains and large grains)
   Yellow Index: 30 (small grains and large grains)
Taste
   Slight nut and bran taste.

It should be understood that, inasmuch the products of the invention are from natural origin, the above numeric values could slightly vary remaining in the scope of this invention.

We claim:

1. A process for the preparation of a foodstuff, in the class of parboiled wheat grains, for human use comprising: in a first step selecting hard wheat grains according to their size; in a second step preheating the selected grains; in a third step moistening the preheated grains; in a fourth step keeping the moistened grains at rest for a period of time of one to two hours; in a fifth step cooking the grains until the cores of the grains are gelatinized; in a sixth step drying and cooling the cooked grains; in a seventh step hulling the grains; in an eighth step expanding the hulled grains; and in a ninth step reconditioning the expanded grains to their initial water content, and recovering the reconditioned grains as a foodstuff.

2. The process of claim 1, in which during the first step, the grains are selected at a size comprised between 2.0-2.8 and 2.8-3.5 mm.

3. The process of claim 1, in which during the second step the selected grains are preheated to a temperature between 30° and 100° C. by exposing the same to a microwave generator for about 2 minutes.

4. The process of claim 1, in which during the third step the preheated grains are moistened to a water content comprised between 20% and 50%, said content depending on the temperature of the subsequent cooking step.

5. The process of claim 1, in which during the fourth step, the moistened grains are maintained at rest at a substantially constant temperature comprised between 50° and 90° C. for 1-2 hours.

6. The process of claim 1, in which during the fifth step the moistened grains are cooked by passing through a microwave generator for about 2 minutes, the inlet temperature being about 50°-90° C. and the outlet temperature being about 90°-105° C.

7. The process of claim 1, in which the second, third, fourth, and fifth steps are continuously carried out in a single reactor, said reactor comprising a cylindrical housing rotating around a screw conveyor and equipped with hot steam generators; and said process conducted in such a manner that the successive steps are overlapping each other, each step starting before the end of the preceding step, so that the peripheric effects of each step upon the grains start during the time the effects of the preceding step are reaching the core of the grain.

8. The process of claim 1, in which during the sixth step the cooked grains are dried in an air draft at an inlet temperature of 120°·150° C. and an outlet temperature of 60°-80° C. for 30-75 minutes, then cooled to room temperature.

9. The process of claim 1, in which during the seventh step, the dried and cooled grains are hulled to an extent of 15-25% by abrasion in an apparatus comprising rotating millstones stacked on a vertical shaft.

10. The process of claim 1, in which during the eighth step, the hulled grains are expanded by heating at 170°-210° C. for 15-30 seconds.

11. The process of claim 1, in which during the ninth step, the expanded grains are remoistened to their initial water content of about 12-13% by spraying thereon an aqueous medium water or a water solution or suspension containing additives, said aqueous medium optionally containing additives selected from the group consisting of flavoring agents, spices, mineral salts, and vitamins.

12. A new foodstuff for human use comprising full hard wheat grains treated by the process of claim 1, and having the following basic properties:
   Size; from small (2-2.8 mm) to large (2.8-3.5 mm);
   Weight of 1000 grains: from 21 g (small) to 31 g (large);
   Water absorption speed at the boiling point (to double the dry weight, which corresponds to a final water content of 67%): from 14 minutes (small grains) to 20 minutes (large grains);
   Expansion rate: 1.35-1.40;
   Oligo-elements content, in mg/100 mg:
      Calcium: from 39.2 (small grains) to 39.5 (large grains)
      Magnesium: from 26.8 (small grains) to 37.8 (large grains)
      Iron: from 1.74 (small grains) to 3.08 (large grains);
   Color
      Luminescence: from >69 (small grains) to >70 (large grains)
      Red index: 1.5 (small grains and large grains)
      Yellow index: 30 (small grains and large grains).

13. A process for the preparation of a food stuff, in the class of parboiled wheat grains, for human use, starting from hard wheat grains comprising, in a first step, selecting said grains at a size comprised between 2.0 and 2.8 mm for the small grains and between 2.8 and 3.5 mm for the large grains;
   following said first step is a 30 to 90 minute gelatinization step, said gelatinization step comprised of a second, third, fourth, and fifth step, wherein said second step the selected grains are preheated by steam heating, wherein in said third step the preheated grains are moistened, wherein in said fourth step the moistened grains are maintained at a temperature of between 90° C. and 100° C., and wherein in said fifth step the grains are cooked by steam heat at a temperature of between 90° C. and 100° C.;
   in a sixth step, drying the cooked grains in an air draft at an inlet temperature of about 120° C. to 150° C. and an outlet temperature of about 60° C. to 80° C. to 30 to 75 minutes, then cooling the grains to room temperature;

in a seventh step, hulling the grains by abrasion between rotating millstones;

in an eighth step, expanding the hulled grains by heating at 170° C. to 210° C. for 15 to 30 seconds;

in the ninth step remoistening the expanded grains to their initial water content of about 12% to 13% by spraying thereon an aqueous medium, said aqueous medium optionally containing additives selected from the group consisting of flavoring agents, spices, mineral salts, and vitamins; and recovering the remoistened grains as a food stuff.

14. The process of claim 13, in which the second, third, fourth and fifth steps are continuously carried out in a single reactor comprising a cylindrical housing rotating around a screw conveyor and equipped with hot steam generators; and said process conducted in such a manner that the successive steps are overlapping each other, each step starting before the end of the preceding step, so that the peripheric effects of each step upon the grains start during the time the effects of the preceding step are reaching the core of the grain.

15. The process of claim 13, wherein said fourth step lasts for about 40 minutes.

16. The process of claim 13, wherein the water content of said grains at the completion of said fifth step is between 30% and 50%.

17. The process of claim 13, wherein the hulling rate of said eighth step is between 15% and 25%.

18. The process of claim 13, wherein the duration of said fourth step is sufficiently long to allow gelatinization to reach the cores of said grains.

19. The method of claim 13, wherein said third step does not use an excess of water.

20. A new foodstuff for human use comprising full hard wheat grains treated by the process of claim 13.

* * * * *